(12) United States Patent
Maeda

(10) Patent No.: US 8,563,164 B2
(45) Date of Patent: Oct. 22, 2013

(54) CYLINDRICAL TYPE ALKALINE STORAGE BATTERY

(75) Inventor: Taishi Maeda, Takasaki (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 671 days.

(21) Appl. No.: 11/526,711

(22) Filed: Sep. 26, 2006

(65) Prior Publication Data

US 2007/0072072 A1    Mar. 29, 2007

(30) Foreign Application Priority Data

Sep. 27, 2005    (JP) .................................. 2005-280010

(51) Int. Cl.
*H01M 4/24*    (2006.01)

(52) U.S. Cl.
USPC .............................. 429/164; 429/94; 429/133

(58) Field of Classification Search
None
See application file for complete search history.

(56) References Cited

U.S. PATENT DOCUMENTS

| 5,278,001 | A | * | 1/1994 | Ono et al. | 429/101 |
| 2005/0031949 | A1 | * | 2/2005 | Maeda | 429/164 |
| 2006/0024581 | A1 | * | 2/2006 | Kihara | 429/218.2 |

FOREIGN PATENT DOCUMENTS

| JP | 08-222232 A | | 8/1996 |
| JP | 08-222265 | * | 8/1996 |
| JP | 2005-056676 A | | 3/2005 |
| JP | 2005-56682 A | | 3/2005 |

* cited by examiner

*Primary Examiner* — Ula C Ruddock
*Assistant Examiner* — Tony Chuo
(74) *Attorney, Agent, or Firm* — Westerman, Hattori, Daniels & Adrian, LLP

(57) ABSTRACT

A cylindrical type alkaline storage battery includes a cylindrical container having electrical conductivity, and an electrode assembly contained in the container, the electrode assembly being a roll obtained by rolling up a positive electrode plate, a negative electrode plate and a separator together. Provided that the maximum diameter of the container is Dmax and that the number of turns of the positive electrode plate is N, the relationship $N \geq [0.5 \times Dmax - 2.65]$ is fulfilled (where "[ ]" represents Gauss' notation). Where the battery is of AA size, for example, the number N of turns is four or more. Also, provided the circumferential position of the roll starting end of the positive electrode plate is a reference position, the angle θ measured from the circumferential position of the roll terminating end of the positive electrode plate to the reference position ranges from 180° to 270°.

17 Claims, 8 Drawing Sheets

CYLINDRICAL TYPE ALKALINE STORAGE BATTERY

BACKGROUND OF THE INVENTION

1. Field of the Invention

The present invention relates to cylindrical type alkaline storage batteries.

2. Description of the Related Art

There has been a strong demand for cylindrical type alkaline storage batteries with higher capacity, especially, higher-capacity nickel-hydrogen storage batteries. Specifically, for AA size batteries, development of nickel-hydrogen storage batteries with a volumetric energy density higher than 400 Wh/l is demanded.

A high-capacity AA size nickel-hydrogen storage battery is disclosed, for example, in Unexamined Japanese Patent Publication No. 2005-056682, in which the battery capacity is enhanced by using a positive electrode plate with an increased thickness. In this battery, the positive electrode plate constituting an electrode assembly is rolled up such that the number of turns thereof is greater than or equal to three and at the same time is smaller than four, and immediately after the rolling, the electrode assembly has a nearly round cross-sectional form. Consequently, a larger-sized electrode assembly or positive electrode plate can be received in the container of the battery, thus making it possible to increase the battery capacity.

A cylindrical type alkaline storage battery with higher capacity can certainly be obtained by increasing the thickness of the positive electrode plate, as disclosed in Unexamined Japanese Patent Publication No. 2005-056682. Increasing the thickness of the positive electrode plate, however, entails increase in current density during the charging/discharging and thus is not desirable from the point of view of quick charging characteristic and discharging characteristic. Also, increase in the thickness/density of the positive electrode plate lowers the productivity of the positive electrode plate fabrication process as well as the battery assembling process. Further, it is difficult to maintain the quality of the obtained positive electrode plates and batteries.

SUMMARY OF THE INVENTION

An object of the present invention is to provide a high-capacity, cylindrical type alkaline storage battery which is high in productivity and quality and which is also excellent in quick charging characteristic and discharging characteristic.

To achieve the object, the present invention provides a cylindrical type alkaline storage battery comprising an electrode assembly contained in a cylindrical container having electrical conductivity, the electrode assembly being a roll obtained by rolling up a positive electrode plate, a negative electrode plate and a separator together, wherein, provided that a maximum diameter of the container is Dmax and that a number of turns of the positive electrode plate is N, a relationship $N \geq [0.5 \times Dmax - 2.65]$ is fulfilled (where "[ ]" represents Gauss' notation), the electrode assembly is rolled up using a core and has a hollow corresponding to the core at a center thereof, a value obtained by dividing a cross-sectional area of the electrode assembly except for the hollow, as viewed in cross section of the battery, by a value obtained by subtracting a cross-sectional area of the hollow in the electrode assembly from a cross-sectional area of an interior of the container is greater than or equal to 95% and is smaller than or equal to 100%, and provided that a circumferential position of a roll starting end of the positive electrode plate is a reference position, an angle $\theta$ measured from a circumferential position of a roll terminating end of the positive electrode plate to the reference position along the positive electrode plate is in a range of from 180° to 270°, both inclusive.

Given that the maximum diameter of the container is Dmax and that the number of turns of the positive electrode plate is N, the battery of the present invention fulfills the relationship $N \geq [0.5 \times Dmax = 2.65]$ (where "[ ]" represents Gauss' notation). Specifically, the number of turns of the positive electrode plate is four or more if the battery is of AA size, and is two or more if the battery is of AAA size. Thus, the number of turns of the positive electrode plate is large, compared with the maximum diameter of the container, and since the area of the positive electrode plate that contributes to the battery cell reaction is large, the current density is low during the charging/discharging of the battery. The battery is therefore not only suited as a high-capacity battery but is excellent in quick charging characteristic and discharging characteristic.

In the battery of the present invention, the capacity is raised by increasing the number of turns of the positive electrode plate. Compared with the case of increasing the capacity by using a thick positive electrode plate, the positive electrode plate can be fabricated and rolled up with ease, making it possible to enhance the productivity and quality of the battery.

Further, in the battery of the present invention, the angle $\theta$ measured from the circumferential position of the roll terminating end of the positive electrode plate to the reference position, that is, the circumferential position of the roll starting end, along the positive electrode plate falls within the range from 180° to 270°, both inclusive. The battery capacity can therefore be increased for the reason stated below.

The angle $\theta$ is set so as to fall within the above range, and accordingly, immediately after the rolling, the outside diameter of the electrode assembly is significantly large at the circumferential position corresponding to the roll terminating end of the positive electrode plate, with the result that the cross-sectional form of the electrode assembly is distorted, compared with the conventional electrode assembly.

Also, the value obtained by dividing the cross-sectional area of the electrode assembly except for the hollow, as viewed in cross section of the battery, by the value obtained by subtracting the cross-sectional area of the hollow in the electrode assembly from the cross-sectional area of the interior of the container is greater than or equal to 95% and at the same time is smaller than or equal to 100%. Thus, when the distorted electrode assembly is contained in the container, the peripheral wall of the container is deformed by the pushing force applied from inside. Immediately after the assembling, therefore, the cross-sectional form of the battery has low roundness and is elliptic.

However, the electrode assembly expands during the activation of the battery, and since the angle $\theta$ is within the aforesaid range, the hollow of the electrode assembly collapses, or is reduced in size, by a greater margin than in the case of the conventional electrode assembly. This is presumably because the force of expansion produced at the circumferential positions corresponding to the roll starting and terminating ends of the positive electrode plate effectively acts as the force of compressing the innermost peripheral portions of the positive and negative electrode plates.

In this manner, the hollow significantly collapses as the electrode assembly expands radially inward, so that the hollow in the electrode assembly is occupied by the positive and negative electrode plates as power generating elements and thus can be effectively used. Also, since the hollow collapses by a large margin, radially outward expansion of the electrode assembly is suppressed, and the electrode assembly expands such that the cross-sectional form thereof becomes rounder. As a result, the roundness of the battery is enhanced by the activation and the actual volume of the battery increases up to a level just short of the volume defined by the specification, so that the battery capacity increases.

The cylindrical type alkaline storage battery of the present invention is therefore not only increased in capacity but enhanced in productivity and quality. Moreover, the battery is excellent in quick charging characteristic as well as discharging characteristic and thus is high in market value.

Preferably, the cylindrical type alkaline storage battery further comprises an innermost turn protective member having electrical insulating property and covering a radially outward surface of an innermost turn of the positive electrode plate, inclusive of the roll starting end. With this arrangement, it is possible to easily and reliably prevent internal short circuit and to further enhance the productivity and quality of the battery, for the reason stated below.

In the battery of the present invention, the number of turns of the positive electrode plate is increased. Thus, the hollow at the center of the electrode assembly is small in size, and since the hollow significantly collapses due to the activation, the innermost turn (innermost peripheral portion) of the positive electrode plate including the roll starting end is liable to be broken or cracked, which is a cause of internal short circuit. According to the preferred embodiment, however, the battery further comprises the innermost turn protective member for covering the innermost peripheral portion of the positive electrode assembly, and the protective member prevents a broken or cracked portion, if caused, from piercing through the separator and coming into direct contact with the negative electrode plate. As a consequence, internal short circuit can be easily and reliably prevented from occurring, making it possible to further enhance the productivity and quality of the battery.

The positive electrode plate preferably has an electrode body extending between the roll starting and terminating ends, and a small-thickness portion smaller in thickness than the electrode body and located at at least one of the roll starting and terminating ends. With this arrangement, at least one of the roll starting and terminating ends of the positive electrode plate is reduced in thickness, compared with the electrode body, and accordingly, although the number of turns of the positive electrode plate is large, the positive and negative electrode plates can be neatly rolled up in spiral form with ease. When the electrode assembly is rolled up, therefore, the positive electrode plate is prevented from being broken or cracked, thus further improving the productivity and quality of the battery.

Preferably, the battery further comprises a boundary protective member having electrical insulating property, the boundary protective member being interposed between the positive electrode plate and the separator covering the radially outward surface of the positive electrode plate and covering the boundary between the small-thickness portion and the electrode body.

With this arrangement, even if burrs protrude from the boundary between the electrode body and small-thickness portion of the positive electrode plate, the boundary protective member prevents such burrs from piercing through the separator and coming into direct contact with the negative electrode plate. Consequently, the quality of the battery can be further enhanced.

Preferably, the protective members each comprise a tape made of resin or a nonwoven fabric made of resin. Resin tape and nonwoven fabric are both flexible and thus can be rolled with ease, and moreover, because the volume is small, such material is suited for increasing the battery capacity.

Further, the small-thickness portion preferably has a fixed thickness or a gradually varying thickness. The small-thickness portion with a fixed or gradually varying thickness can be formed with ease, making it possible to enhance the productivity of the battery.

Preferably, the core has an outside diameter smaller than or equal to 30% of the maximum diameter of the container. Since the outside diameter of the core is smaller than or equal to 30% of the maximum diameter of the container, the number of turns of the positive electrode plate can be easily increased. Also, in this battery, high capacity is achieved by increasing the number of turns of the positive electrode plate, and thus, although the core with a small outside diameter is used, the positive electrode plate can be rolled up with ease, compared with the case of a battery whose capacity is increased by using a thick positive electrode plate. In addition, the positive electrode plate can be prevented from being broken or cracked at its innermost peripheral portion. Accordingly, the capacity of the battery can be easily increased while at the same time ensuring productivity and quality.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION

Figure 1:
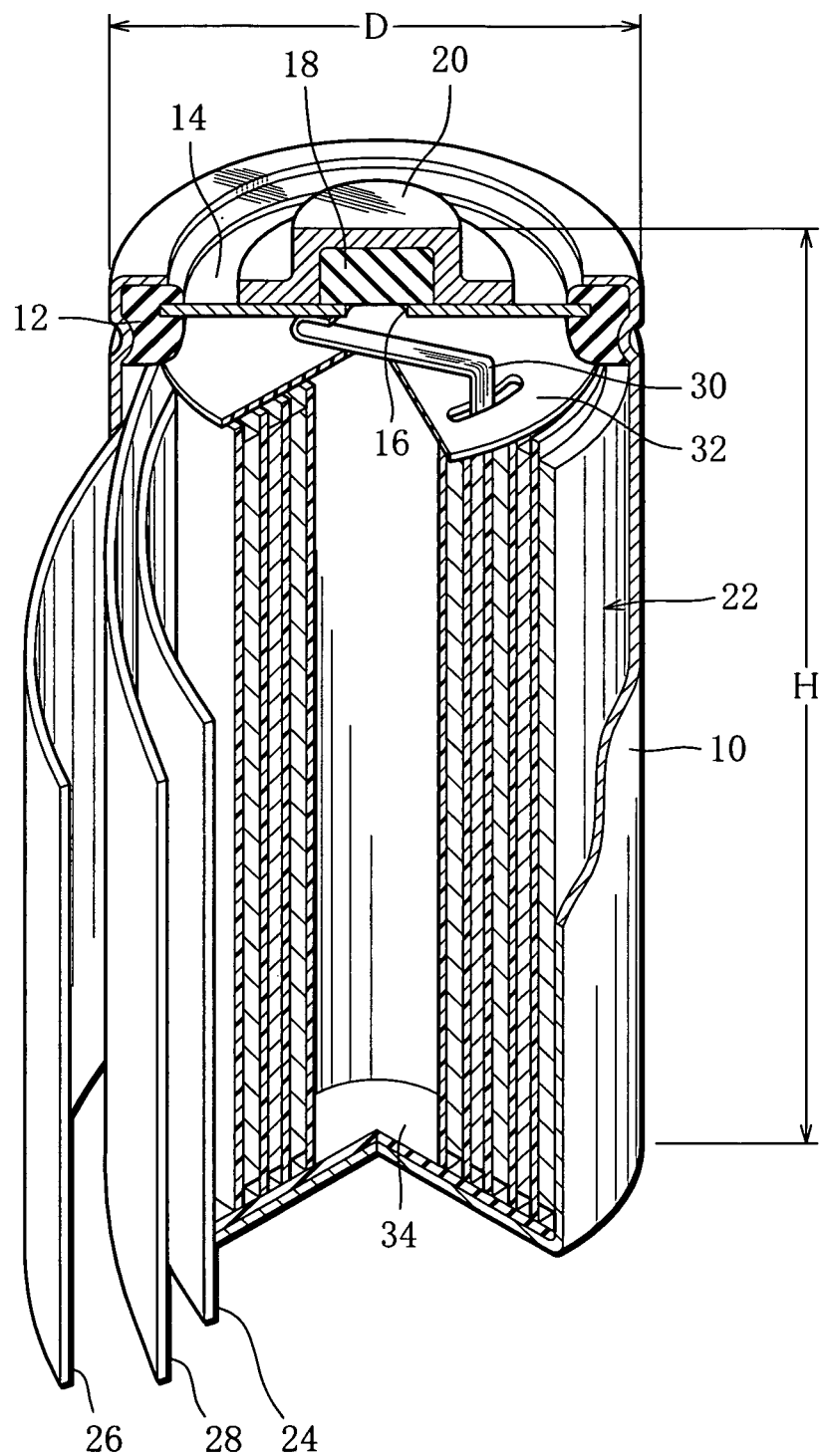
FIG. 1 is a partly cutaway perspective view of a cylindrical type nickel-hydrogen secondary battery according to one embodiment of the present invention.

As a solution to the problems mentioned above, the inventors hereof conceived the idea of increasing the length of the positive electrode plate, instead of increasing the thickness of same. However, if the length of the positive electrode plate is merely increased, the total volume of members that have no direct connection with the battery cell reaction, such as the electrode cores of the positive and negative electrode plates and the separator, also increases, so that the amount of the positive active material in the battery relatively decreases, lowering the battery capacity.

Accordingly, the inventors studied various measures to increase the length of the positive electrode plate without incurring reduction in the battery capacity and, in the process of study, took the following into consideration.

In conventional batteries, to allow a larger-sized electrode assembly to be fitted into the container, the electrode assembly is rolled up so that immediately after the rolling, the electrode assembly may have a cross-sectional form close to a complete round. Specifically, the electrode assembly is rolled up such that, provided the circumferential position of the roll starting end of the positive electrode plate is a reference position, the angle measured from the circumferential position of the roll terminating end of the positive electrode plate to the reference position along the positive electrode plate is greater than 270° and at the same time is smaller than or equal to 360°.

However, even if the electrode assembly is rolled up in this manner, the cross-sectional form of the battery lowers in roundness and changes into an elliptic form because the electrode assembly expands during an activation process (initial charging/discharging process) following the assembling.

Meanwhile, the specifications for cylindrical type alkaline batteries generally prescribe only the maximum diameters of batteries, and a battery having such an unavoidable elliptic cross-sectional form is produced so that the length of the major axis of the ellipse may not exceed the maximum diameter. Consequently, the actual volume of such an elliptic cylinder-shaped battery is significantly smaller than the volume of a cylinder having a diameter equal to the maximum diameter determined by the specification, that is, the volume prescribed by the specification. Thus, if a battery can be produced which has a nearly round cross-sectional form even after the activation, then it is possible to increase the actual volume of the battery up to a level just short of the volume defined by the specification, and as a consequence, to increase the length of the positive electrode plate without lowering the battery capacity.

To embody the idea, the inventors made additional investigation and arrived at the conclusion that a battery whose electrode assembly has a nearly round cross-sectional form immediately after the rolling does not necessarily come to have a nearly round cross-sectional form after the activation, and that a battery whose electrode assembly has a rather distorted cross-sectional form immediately after the rolling comes to have a nearly round cross-sectional form after the activation. As a result of the investigation, the inventors devised the battery construction of the present invention.

FIG. 1 shows a cylindrical type nickel-hydrogen secondary battery of AA size according to one embodiment of the present invention.

The battery has a cylindrical container 10 opening at one end and closed at the other. The container 10 is made of a steel plate plated with nickel. For the steel plate, ordinary cold rolled steel such as SPCC (used for general purposes), SPCD (used for drawing) or SPCE (used for deep drawing) may be used. The peripheral wall of the container 10 has a thickness of 0.17 mm or less. The container 10 has an outside diameter D, and after the activation process of the battery, the outside diameter D has a maximum value (maximum diameter Dmax) ranging from 13.5 mm to 14.5 mm, both inclusive. Where the battery is of AAA size, the maximum diameter Dmax is in the range of from 9.8 mm to 10.5 mm.

The container 10 has electrical conductivity and functions as a negative terminal. In the open end of the container 10 is fitted an electrically conductive lid 14 with a ring-shaped insulating packing 12 therebetween. The open end of the container 10 is caulked, or narrowed inward, to fix the insulating packing 12 and the lid 14 in position inside the open end.

The lid 14 has a gas vent hole 16 formed in the center thereof, and a valve element 18 of rubber is arranged on the outer surface of the lid 14 so as to close the gas vent hole 16. Further, a cylindrical positive terminal 20 with a flange is fixed on the outer surface of the lid 14 coaxially therewith so as to surround the valve element 18 and axially protrudes from the open end of the container 10. The positive terminal 20 presses the valve element 18 against the lid 14, and therefore, the container 10 is normally sealed in an airtight manner by the insulating packing 12, the valve element 18 and the lid 14. On the other hand, when the internal pressure of the container 10 rises due to the generation of gas, the valve element 18 is compressed, allowing the gas to be released from the container 10 through the gas vent hole 16. Namely, the lid 14, the valve element 18 and the positive terminal 20 constitute a safety valve that operates when the internal pressure of the battery exceeds a predetermined pressure.

The length of the battery from the distal end of the positive terminal 20 to the bottom surface of the container 10, that is, the height H of the battery is in the range from 49.2 mm to 50.5 mm, and the volume Vb of the battery as defined by the specification is given by the following equation on the assumption that the volume Vb is equal to that of a cylinder with the diameter Dmax and the height H:

$$Vb=\pi(Dmax/2)^2 \times H$$

A nearly cylindrical electrode assembly 22 is received in the container 10 nearly coaxially therewith and has an outermost peripheral portion disposed in direct contact with the inner peripheral surface of the container 10. The electrode assembly 22 comprises a positive electrode plate 24, a negative electrode plate 26 and a separator 28, spirally rolled up together. Radially inward and outward surfaces of the positive electrode plate 24 face radially outward and inward surfaces of the negative electrode plate 26, respectively, with the separator 28 therebetween.

A positive lead 30 is arranged inside the container 10 and between one end of the electrode assembly 22 and the lid 14, and has opposite ends welded to the positive electrode plate 24 and the lid 14, respectively. Accordingly, the positive terminal 20 and the positive electrode plate 24 are electrically connected to each other by the positive lead 30 and the lid 14. More specifically, when the lid 14 is fitted in the open end of the container 10, the positive lead 30, which is in the form of a strip, is interposed between the electrode assembly 22 and the lid 14 while being bent as illustrated, and the end portion of the positive lead 30 close to the electrode assembly 22 is brought into surface contact with and welded to one surface of the positive electrode plate 24. A circular insulating member 32 is positioned between the lid 14 and the electrode assembly 22, and the positive lead 30 extends through a slit cut in the insulating member 32. Another circular insulating member 34 is placed between the electrode assembly 22 and the bottom of the container 10.

Figure 2:
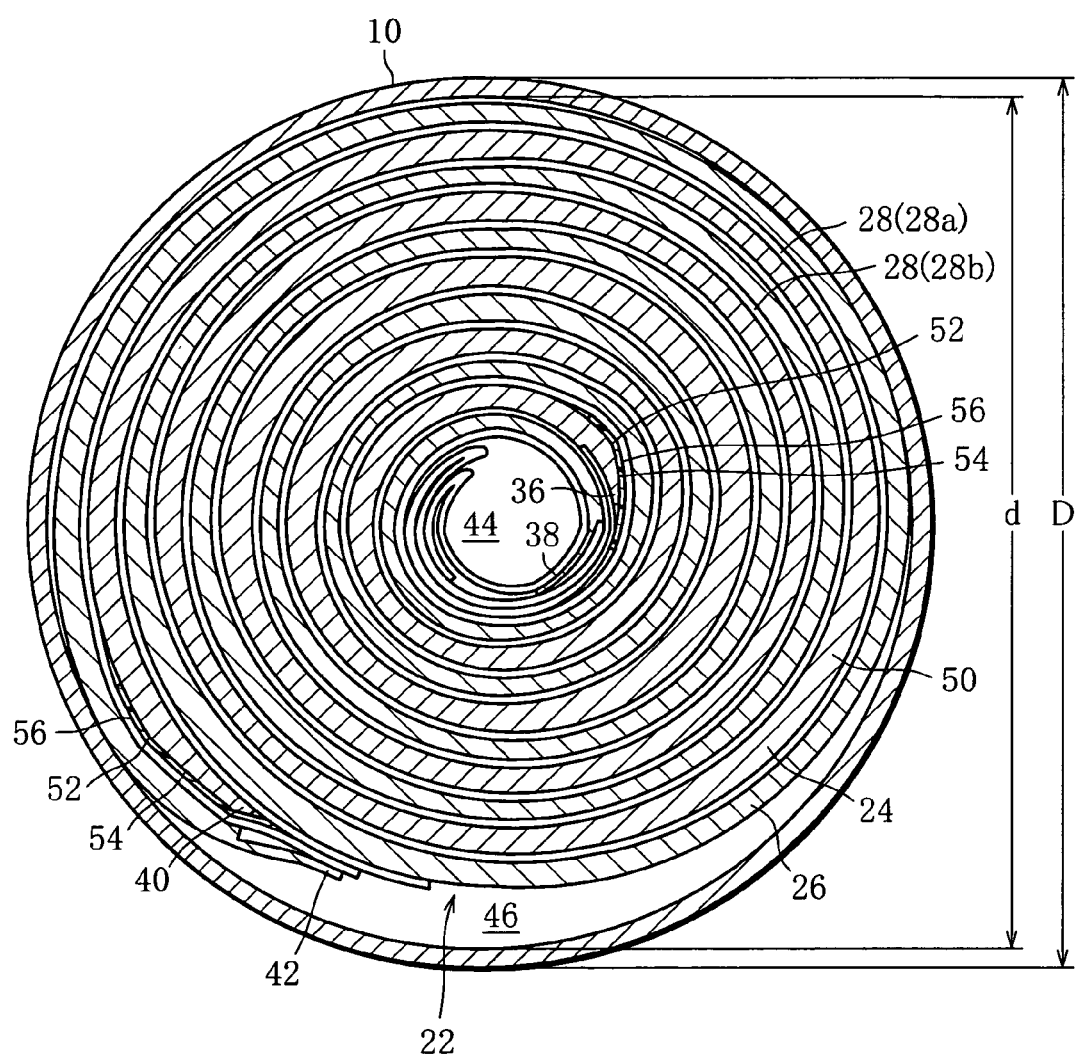
FIG. 2 schematically shows a cross section of the battery of FIG. 1.

The electrode assembly 22 is formed by first preparing the positive electrode plate 24, the negative electrode plate 26 and the separator 28, each in the form of a strip, and then spirally rolling, around a core, the positive and negative electrode plates 24 and 26 with the separator 28 therebetween from their one end. Consequently, as shown in FIG. 2, the positive and negative electrode plates 24 and 26 have their one ends (roll starting ends) 36 and 38 located close to the axis of the electrode assembly 22 and have other ends (roll terminating ends) 40 and 42 located at the outer periphery of the electrode assembly 22.

The negative electrode plate 26 has a greater length than the positive electrode plate 24. The innermost turn (innermost peripheral portion) of the negative electrode plate 26 including the roll starting end 38 is wound inward of the innermost turn (innermost peripheral portion) of the positive electrode plate 24 including the roll starting end 36, as viewed in the radial direction of the electrode assembly 22, and the outermost turn (outermost peripheral portion) of the negative electrode plate 26 including the roll terminating end 42 is wound outward of the outermost turn (outermost peripheral portion) of the positive electrode plate 24 including the roll terminating end 40.

The separator 28 is not wound around the outer periphery of the electrode assembly 22, and the outermost peripheral portion of the negative electrode plate 26 constitutes the outer periphery of the electrode assembly 22. Accordingly, the outermost peripheral portion of the negative electrode plate 26 comes into direct contact with and thus is electrically connected to the container 10.

After the rolling, the core is pulled out of the electrode assembly 22, so that the electrode assembly 22 has at its center a hollow 44 corresponding in shape to the core. However, since the hollow 44 collapses as the electrode assembly 22 expands during the activation of the battery, as described later, the shape of the hollow 44 after the activation is different from that of the core.

Figure 3A:
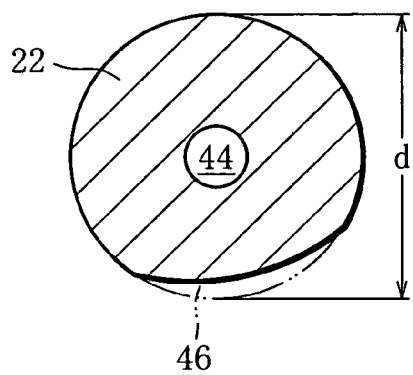
FIG. 3A is a schematic diagram showing the cross-sectional area of an electrode assembly in the battery of FIG. 1.
Figure 3B:
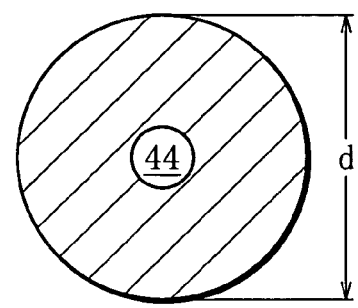
FIG. 3B is a schematic diagram showing a cross-sectional area obtained by subtracting the cross-sectional area of a hollow of the electrode assembly from the cross-sectional area of the interior of a container of the battery shown in FIG. 1.

The cross-sectional area of the electrode assembly 22 is, as indicated by hatching in FIG. 3A, equal to a value obtained by subtracting the cross-sectional area of the hollow 44 and the cross-sectional area of a gap 46 between the electrode assembly 22 and the container 10 from the cross-sectional area of the interior of the container 10 defined by the peripheral wall thereof. According to the present invention, the cross-sectional area of the electrode assembly 22 is set such that the value obtained by dividing the cross-sectional area of the electrode assembly 22 by a value obtained by subtracting the cross-sectional area of the hollow 44 from the cross-sectional area of the interior of the container 10, that is, the cross-sectional area indicated by hatching in FIG. 3B, falls within a range of from 95% to 100%, both inclusive. In the following, the ratio of the cross-sectional area shown in FIG. 3A to that shown in FIG. 3B is referred to as the electrode assembly area ratio.

Also, provided the number of turns of the positive electrode plate 24 in the electrode assembly 22 is N, the number N of turns and the maximum diameter Dmax of the container 10 bear the relationship $N \geq [0.5 \times Dmax - 2.65]$ (where "[ ]" represents Gauss' notation). Accordingly, in the case of the AA size battery, the number N of turns of the positive electrode plate 24 is four or more, and in the case of the AAA size battery, the number N of turns is two or more. FIG. 1 is given for the purpose of illustration only, and for this reason, the number N of turns of the positive electrode plate 24 shown in the figure is smaller than four.

Figure 4:
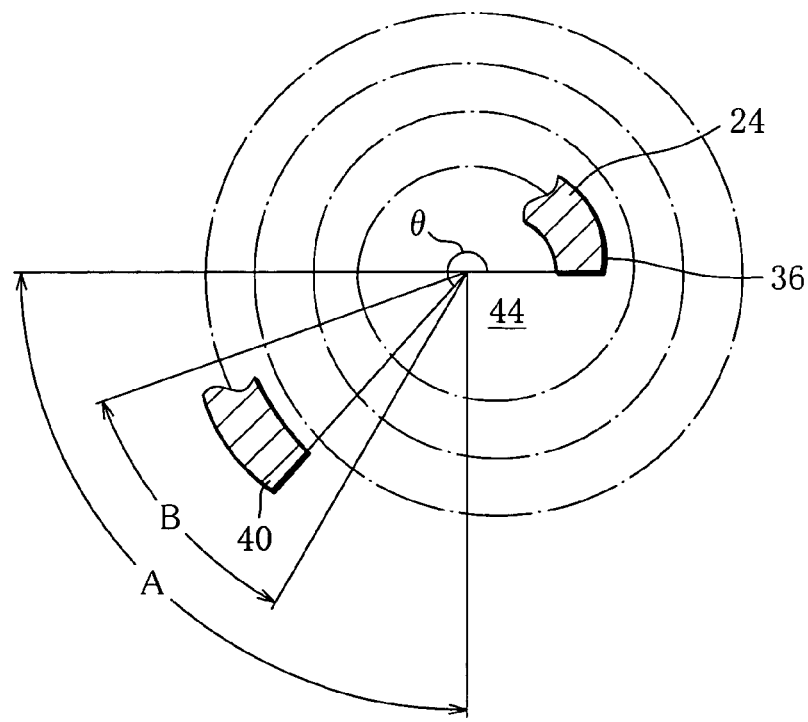
FIG. 4 illustrates the relationship between the circumferential position of a roll terminating end of a positive electrode plate and that of a roll starting end of same, in the cross section shown in FIG. 2.

Further, as seen from FIG. 4 schematically showing part of the positive electrode plate 24, the roll starting end 36 and roll terminating end 40 of the positive electrode plate 24 are positioned in the following manner as viewed in cross section of the battery. Provided the circumferential position of the roll starting end 36 of the positive electrode plate 24 is a reference position, the angle θ measured from the circumferential position of the roll terminating end 40 to the reference position along the positive electrode plate 24 falls within a range A from 180° to 270°, both inclusive, preferably within a range B from 200° to 240°, both inclusive.

The positive electrode plate 24 is constituted by an electrically conductive positive electrode core and a positive material mixture supported on the positive electrode core.

More specifically, for the positive electrode core, a metallic structure of nickel having a three-dimensional network may be used, and the positive material mixture is filled in the positive electrode core.

The positive material mixture contains particles of positive active material, particles of various additives for improving characteristics of the positive electrode plate, and a binder for binding the mixture of the positive active material particles and the additive particles to the positive electrode core.

Since the battery of this embodiment is a nickel-hydrogen secondary battery, particles of nickel hydroxide are used as the positive active material. The nickel hydroxide particles may, however, be prepared as a solid solution containing cobalt, zinc, cadmium, etc., or the surfaces of the particles may be covered in part or in their entirety with a cobalt compound. The additives and the binder to be used are not particularly limited. For the additives, cobalt compounds such as cobalt oxide, metallic cobalt and cobalt hydroxide, zinc compounds such as metallic zinc, zinc oxide and zinc hydroxide, and rare-earth compounds such as erbium oxide may be used, besides yttrium oxide. For the binder, a hydrophilic or hydrophobic polymer or the like may be used.

The amount of the positive active material contained in the positive material mixture for the positive electrode plate 24 is set so that the battery may have a volumetric energy density higher than or equal to 400 Wh/l and at the same time lower than or equal to 470 Wh/l. The volumetric energy density is derived by multiplying the 0.2 C capacity of the battery by an operating voltage of 1.2 V and dividing the product obtained by the aforementioned volume Vb of the battery. The 0.2 C capacity of battery is defined in JIS C 8708-1997 and is obtained in the following manner. First, a battery kept at an ambient temperature of 20±5° C. is charged at a rate equivalent to 0.1 C for 16 hours, and after being kept at rest for one to four hours, the battery is discharged at a rate equivalent to 0.2 C to a discharge end voltage of 1.0 V, to measure the 0.2 C capacity.

Figure 5:
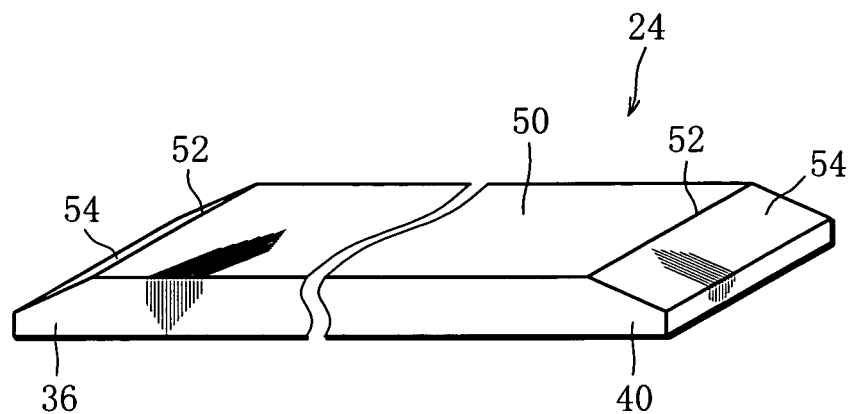
FIG. 5 is a perspective view showing an unrolled state of the positive electrode plate used in the battery of FIG. 1.

FIG. 5 shows the external form of the positive electrode plate 24 in an unrolled state. The positive electrode plate 24 has an electrode body 50 having a constant thickness along its length, and the thickness of the electrode body 50 is in the range of from 0.62 mm to 0.72 mm, for example. The roll starting end portion 36 and the roll terminating end portion 40, which are located at opposite ends of the electrode body 50, are preferably formed as small-thickness portions with a smaller thickness than the electrode body 50.

Figure 6:
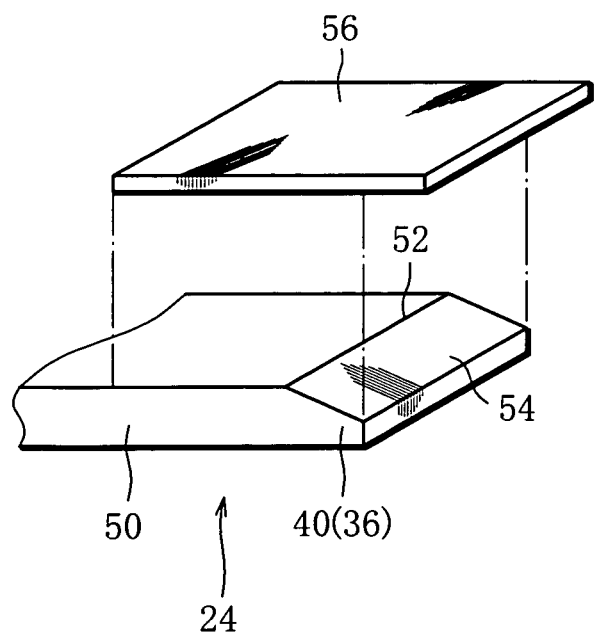
FIG. 6 is a perspective view showing part of the positive electrode plate of FIG. 5 and a boundary protective member, both in an unrolled state.

More specifically, as shown in FIG. 6 in enlargement, the end portions 36 and 40 each have a slope 54 forming a radially outward surface and extending from an edge 52, which is a boundary adjoining the electrode body 50, to a distal end thereof, so that the thickness of the positive electrode plate 24 gradually decreases at a constant rate from the edge 52 toward the distal end. As for the radially inward surface of the positive electrode plate 24, the end portions 36 and 40 are flush with the electrode body 50 at their boundaries. Accordingly, the end portions 36 and 40 are tapered with a decreasing thickness toward their distal ends.

The slope 54 is formed on the outer surface of each of the end portions 36 and 40 by shaving or pressing, as described later. When the slope 54 is formed, therefore, burrs may protrude from the edge 52 or its vicinity. Accordingly, the edge 52 is preferably covered with a boundary protective member 56.

The boundary protective member 56 is interposed between the positive electrode plate 24 and the separator 28 adjacent to the radially outward surface of the positive electrode plate 24 (see FIG. 2) and covers a corresponding one of the boundary between the electrode body 50 and the end portion 36 and the boundary between the electrode body 50 and the end portion 40. The boundary protective member 56 comprises an electrically insulating PP (polypropylene) tape and is capable of covering the entire edge 52 of the positive electrode plate 24.

The dimensions of each boundary protective member 56 are set so that when the electrode assembly 22 is inserted into the container 10, the burrs at the edge 52 or in its vicinity may not penetrate through the boundary protective member 56 and the separator 28. However, the dimensions of the boundary protective members are not particularly limited.

Also, the material and form of each boundary protective member 56 are determined so that when the electrode assembly 22 is inserted into the container 10, the burrs at the edge 52 or in its vicinity may not penetrate through the boundary protective member 56 and the separator 28, but are not particularly limited. As the material of the boundary protective member 56, however, a polyolefin polymer having both alkali resistance and hydrophilic property, for example, PP (polypropylene), is preferred, and the boundary protective member 56 is preferably in the form of a sheet such as a sheet of nonwoven fabric or a tape of resin.

The negative electrode plate 26 is constituted by an electrically conductive negative electrode core and a negative material mixture supported on the negative electrode core.

Since the battery of this embodiment is a nickel-hydrogen secondary battery, the negative material mixture contains, as a negative active material, particles of a hydrogen storage alloy capable of storing and releasing hydrogen, and a binder. Alternatively, a cadmium compound, for example, may be used in place of the hydrogen storage alloy to obtain a nickel-cadmium secondary battery. To obtain higher battery capacity, however, a nickel-hydrogen secondary battery is preferred. In the case where the active material is hydrogen, the capacity of the negative electrode is determined by the amount of the hydrogen storage alloy, and therefore, the hydrogen storage alloy is referred to herein also as the negative active material.

For the hydrogen storage alloy, any alloy may be used insofar as it can store hydrogen generated electrochemically in an alkaline electrolyte during the charging of the battery and also can readily release the stored hydrogen during the discharging of the battery. The hydrogen storage alloy to be used is not particularly limited and an $AB_5$ type alloy such as $LaNi_5$ or $MmNi_5$ (Mm represents misch metal) may be used, for example. For the binder, a hydrophilic or hydrophobic polymer or the like may be used.

As the negative electrode core, a punching metal, a substrate prepared by sintering metallic powder, an expanded metal, a nickel net or the like may be used, for example.

The separator 28 may be made of a nonwoven fabric of polyamide fibers or a nonwoven fabric of polyolefin fibers, such as polyethylene or polypropylene fibers, applied with a hydrophilic functional group. In this embodiment, the separator 28 includes, as shown in FIG. 2, a first separator 28a interposed between the radially outward surface of the positive electrode plate 24 and the radially inward surface of the negative electrode plate 26, and a second separator 28b interposed between the radially inward surface of the positive electrode plate 24 and the radially outward surface of the negative electrode plate 26.

A predetermined amount of alkaline electrolyte (not shown) is poured into the container 10 containing the electrode assembly 22. A charging/discharging reaction takes place between the positive and negative electrode plates 24 and 26 through the medium of the alkaline electrolyte soaking into the separator 28.

There are no particular restrictions on the kind of alkaline electrolyte to be used, and an aqueous solution of sodium hydroxide, an aqueous solution of lithium hydroxide, an aqueous solution of potassium hydroxide, or a mixture of two or more of these aqueous solutions may be used, for example. The concentration of the alkaline electrolyte is also not particularly limited and may be 8N, for example.

The battery described above can be fabricated by an ordinary method. The following explains an exemplary method for rolling up the electrode assembly 22.

Figure 7:
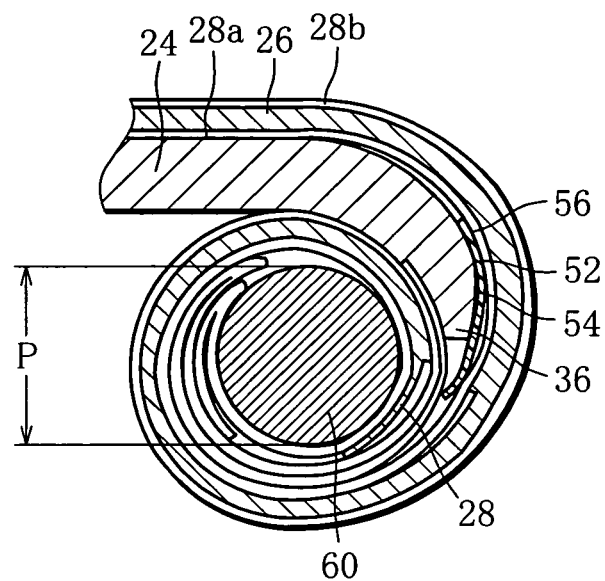
FIG. 7 illustrates a method of rolling up the electrode assembly used in the battery of FIG. 1.

As shown in FIG. 7, the electrode assembly 22, which includes the positive and negative electrode plates 24 and 26 and the first and second separators 28a and 28b, is continuously fed to a cylindrical core 60 rotated in one direction and is wound around the core 60. The outside diameter P of the core 60 is not particularly limited but preferably ranges from 0% to 30% of the maximum diameter Dmax of the container 10.

In FIG. 7, hatching for the first and second separators 28a and 28b is omitted, as in FIG. 2, in order to avoid crowdedness of lines, and also the positive and negative electrode plates 24 and 26 are each illustrated without making a distinction between the electrode core and the material mixture.

In the battery, the number N of turns of the positive electrode plate 24 in the electrode assembly 22 and the maximum diameter Dmax of the container 10 fulfill the relationship $N \geq [0.5 \times Dmax - 2.65]$ (where "[ ]" represents Gauss' notation). Thus, in this embodiment, the number N of turns of the positive electrode plate 24 is four or more, which is large compared with the maximum diameter Dmax, and since the area of the positive electrode plate 24 that contributes to the battery cell reaction is increased, the current density during the charging/discharging of the battery lowers. The battery is therefore not only suitable as a high-capacity battery but also is excellent in quick charging characteristic and discharging characteristic.

Also, since the capacity of the battery is increased by increasing the number N of turns of the positive electrode plate 24, the positive electrode plate 24 can be fabricated and rolled with ease, compared with the case of increasing the battery capacity by using a thicker positive electrode plate, whereby the productivity and quality of the battery can be enhanced.

Further, the roll starting end 36 and roll terminating end 40 of the positive electrode plate 24 are positioned in the following manner, as viewed in cross section of the battery. The angle θ measured from the circumferential position of the roll terminating end 40 to the reference position, that is, the circumferential position of the roll starting end 36, along the positive electrode plate 24 falls within the range A of from 180° to 270°, preferably within the range B of from 200° to 240°. The battery capacity can therefore be increased for the reason stated below.

The angle θ is set so as to fall within the above range, and accordingly, immediately after the rolling, the outside diameter of the electrode assembly 22 is significantly large at the circumferential position corresponding to the roll terminating end 40 of the positive electrode plate 24, with the result that the cross-sectional form of the electrode assembly 22 is distorted, compared with the conventional electrode assembly.

Also, the aforementioned electrode assembly area ratio is set so as to range from 95% to 100%. Thus, when the distorted electrode assembly 22 is contained in the container 10, the peripheral wall of the container 10 is deformed by the pushing force applied from inside. Immediately after the assembling, therefore, the cross-sectional form of the battery has low roundness and is elliptic.

Figure 8:
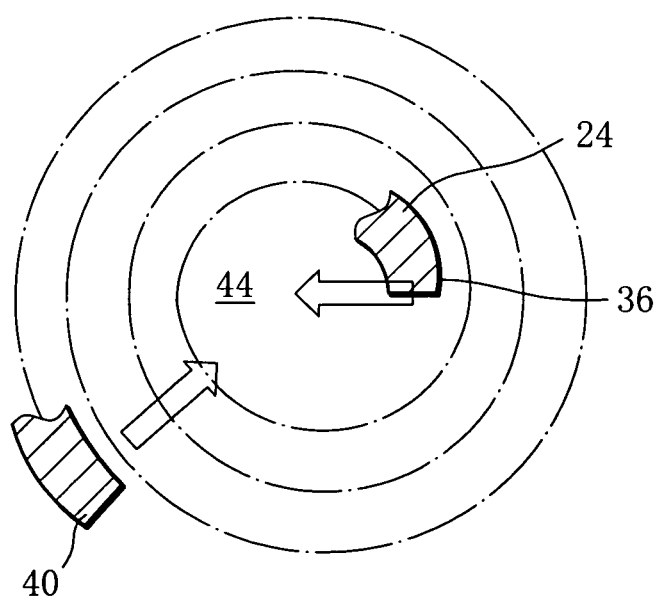
FIG. 8 illustrates compressive force acting on the innermost peripheral portion of the electrode assembly during activation of the battery of FIG. 1.

However, the electrode assembly 22 expands during the activation of the battery, and since the angle θ is within the aforesaid range, the hollow 44 of the electrode assembly 22 collapses, or is reduced in size, by a greater margin than in the case of the conventional electrode assembly. This is because the force of expansion produced at the circumferential positions corresponding to the roll starting and terminating ends 36 and 40 of the positive electrode plate 24 effectively acts as the force of compressing the innermost peripheral portions of the positive and negative electrode plates 24 and 26, as shown in FIG. 8.

In this manner, the hollow 44 significantly collapses as the electrode assembly 22 expands radially inward, so that the hollow 44 in the electrode assembly 22 is occupied by the positive and negative electrode plates 24 and 26 as power generating elements and thus can be effectively used. Also, since the hollow 44 collapses by a large margin, radially outward expansion of the electrode assembly 22 is suppressed, and the electrode assembly 22 expands such that the cross-sectional form thereof becomes rounder. Consequently, the roundness of the battery is enhanced by the activation and the actual volume of the battery increases up to a level just short of the volume defined by the specification, so that the battery capacity increases.

Also, the positive electrode plate 24 is preferably formed such that the end portions 36 and 40 are smaller in thickness than the electrode body 50, and this permits the positive and negative electrode plates 24 and 26 to be neatly rolled up in spiral form as viewed in cross section of the battery. Consequently, the positive electrode plate 24 is prevented from being broken or cracked during the rolling of the electrode assembly 22, thus further enhancing the productivity and quality of the battery.

Further, the electrically insulating boundary protective members 56 are preferably interposed between the positive electrode plate 24 and the first separator 28a adjacent to the radially outward surface of the positive electrode plate 24 so as to respectively cover the boundary between the small-thickness end portion 36 and the electrode body 50 and the boundary between the small-thickness end portion 40 and the electrode body 50. Thus, even if burrs protrude from such boundaries, the boundary protective members 56 prevent the burrs from piercing through the separator 28 and coming into direct contact with the negative electrode plate 26. As a result, the quality of the battery can be further improved.

Moreover, the outside diameter P of the core 60, which is used for rolling up the electrode assembly 22, is preferably equal to or smaller than 30% of the maximum diameter Dmax of the container, and this makes it possible to increase with ease the number N of turns of the positive electrode plate 24. Also, in this battery, high capacity is achieved by increasing the number N of turns of the positive electrode plate 24, and thus, although the core 60 with a small outside diameter P is used, the positive electrode plate 24 can be rolled up with ease, compared with the case of a battery whose capacity is increased by using a thick positive electrode plate. In addition, the positive electrode plate 24 can be prevented from being broken or cracked at its innermost peripheral portion. Accordingly, the capacity of the battery can be easily increased while at the same time ensuring productivity and quality.

EXAMPLES

Example 1

1. Fabrication of Positive Electrode Plate

Nickel hydroxide powder of which the individual particles were covered in their entirety or in part with a cobalt compound was prepared. Then, the nickel hydroxide powder were mixed with 40% by mass of an HPC dispersion to prepare a slurry for the positive electrode. The slurry was applied to and filled in a metallic structure of nickel having a three-dimensional network, which was then dried, rolled, and cut to obtain a positive electrode plate of AA size.

2. Fabrication of Negative Electrode Plate

Metallic materials so proportioned as to have the composition $Mm_{1.0}Ni_{3.7}Co_{0.8}Al_{0.3}Mn_{0.2}$ (where Mm represents misch metal) were mixed, and the mixture was melted in a high-frequency furnace to obtain an ingot. The ingot was heated at a temperature of 1000° C. for 10 hours in an argon atmosphere so that the crystal structure of the ingot might change to $AB_5$ type structure. Subsequently, the ingot was crushed mechanically and sieved in an inert atmosphere, to obtain $AB_5$ type hydrogen storage alloy powder. The average particle size corresponding to weight integral 50% of the hydrogen storage alloy powder obtained, measured using a laser diffraction-scattering particle-size distribution measurement device, was 50 μm.

Then, 100 parts by mass of the obtained alloy powder were admixed with 0.5 part by mass of sodium polyacrylate, 0.12 part by mass of carboxymethyl cellulose, 0.5 part by mass (in terms of solid content) of PTFE dispersion (disperse medium: water; specific gravity: 1.5; solid content: 60 mass %), 1.0 part by mass of carbon black and 30 parts by mass of water, and the mixture was kneaded to obtain a slurry for the negative electrode. The slurry was applied to a punching sheet of nickel, which was then dried, rolled, and cut to obtain a negative electrode plate of AA size.

3. Assembling of Nickel-Hydrogen Storage Battery

Using separators made of nonwoven fabric of polypropylene fibers and having a thickness of 0.1 mm and METSUKE (weight per area) of 40 g/m², the positive and negative electrode plates obtained in the aforementioned manner were spirally rolled up with the separators interposed therebetween, to obtain an electrode assembly. After the electrode assembly obtained was put in the container and a determined fitting process was performed, an alkaline electrolyte containing an aqueous solution of potassium hydroxide with a concentration of 7N and an aqueous solution of lithium hydroxide with a concentration of 1N was poured into the container. Subsequently, the open end of the container was closed with the lid etc., thereby completing the assembling of an enclosed, AA-size cylindrical type nickel-hydrogen storage battery of Example 1 with a rated capacity of 2500 mAh.

Examples 2 to 6 & Comparative Examples 1 to 5

A plurality of positive electrode plates with different lengths were fabricated so as to vary the circumferential position (angle θ) of the roll terminating end relative to the circumferential position of the roll starting end as shown in Table 1 below. At this time, for the positive electrode plate with a greater length, the metallic structure was filled with a smaller amount of the slurry and was rolled to a smaller thickness by increasing the reduction ratio so as to equalize the battery capacity. Except for the use of the positive electrode plates obtained in this manner, nickel-hydrogen storage batteries of Examples 2 to 6 and Comparative Examples 1 to 5 were assembled in the same manner as in Example 1.

4. Evaluation of Shapes of Batteries

Immediately after the assembling, maximum and minimum diameters of each battery were measured, and the minimum diameter was divided by the maximum diameter to obtain roundness.

Subsequently, each battery was subjected to an activation process in which, in an environment at a temperature of 25° C., the battery was first charged at a charging current of 0.1 It for 15 hours and then discharged at a discharging current of 0.2 It to a discharge end voltage of 1.0 V. Following the activation, maximum and minimum diameters of each battery were measured, and the minimum diameter was divided by the maximum diameter to obtain roundness.

Figure 9:
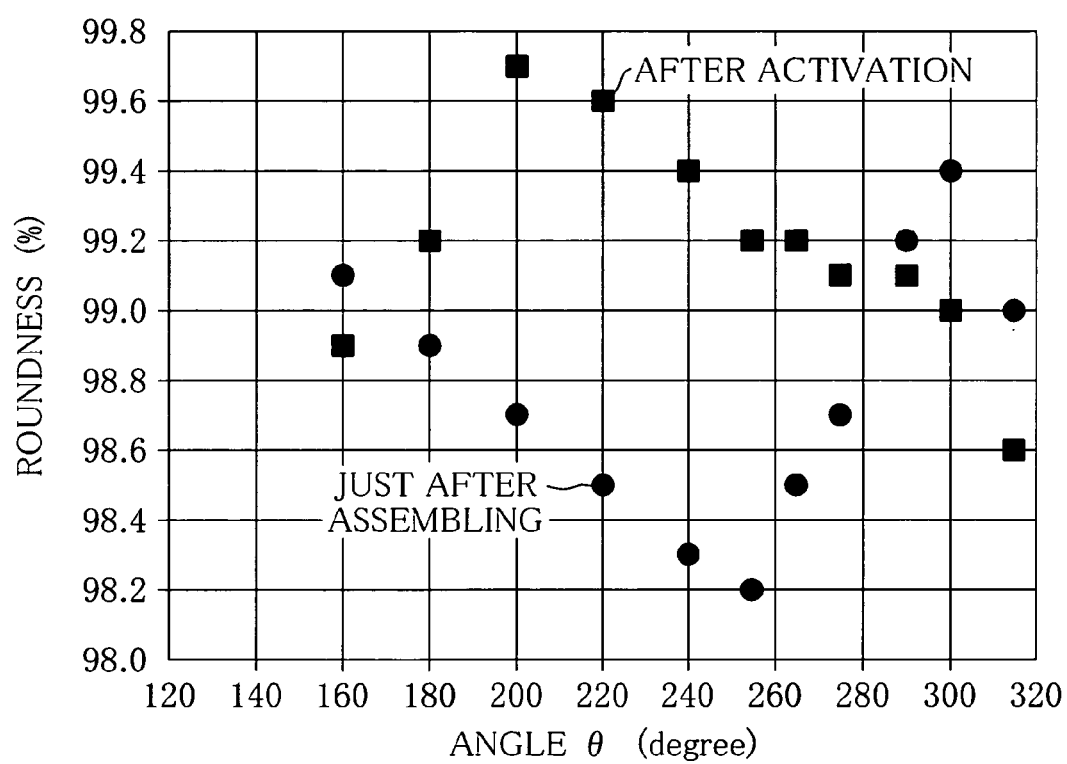
FIG. 9 is a graph showing the relationship between the circumferential position (angle θ) of the roll terminating end of the positive electrode plate and the roundness of the battery immediately after assembling as well as the roundness of the battery after the activation.
Figure 10:
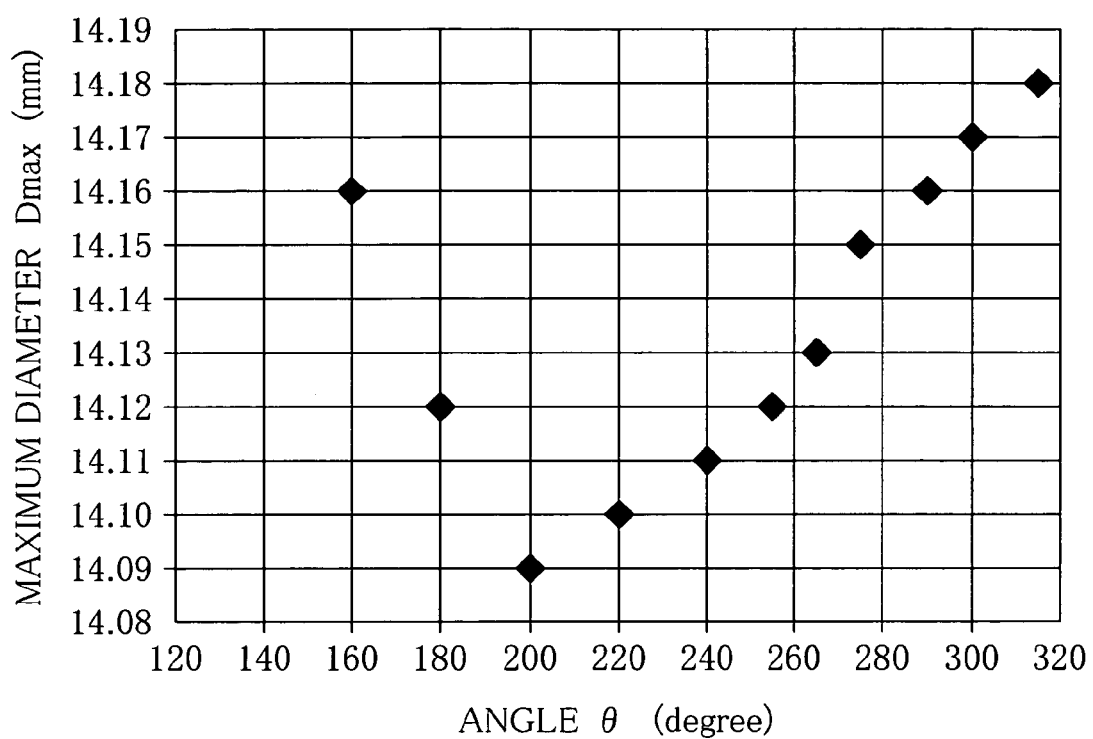
FIG. 10 is a graph showing the relationship between the circumferential position (angle θ) of the roll terminating end of the positive electrode plate and the maximum diameter Dmax of the battery after the activation.

Table 1 shows, with respect to each battery, the roundness immediately after the assembling (before the activation), the roundness after the activation, and the maximum diameter after the activation. Also, FIG. 9 shows the relationship between the circumferential position (angle θ) of the roll terminating end and the roundness (before and after the activation), and FIG. 10 shows the relationship between the circumferential position (angle θ) of the roll terminating end and the maximum diameter Dmax. In Table 1, the roundness values and the maximum diameters each represent an average value derived from 10 batteries fabricated in the same manner.

TABLE 1

| | Circumferential Position of Roll Terminating End of Positive Electrode Plate (deg.) | Roundness Right After Assembling (%) | Roundness After Activation (%) | Maximum Diameter After Activation (mm) |
|---|---|---|---|---|
| Comparative Example 1 | 160 | 99.1 | 98.9 | 14.16 |
| Example 1 | 180 | 98.9 | 99.2 | 14.12 |
| Example 2 | 200 | 98.7 | 99.7 | 14.09 |
| Example 3 | 220 | 98.5 | 99.6 | 14.10 |
| Example 4 | 240 | 98.3 | 99.4 | 14.11 |
| Example 5 | 255 | 98.2 | 99.2 | 14.12 |
| Example 6 | 265 | 98.5 | 99.2 | 14.13 |
| Comparative Example 2 | 275 | 98.7 | 99.1 | 14.15 |
| Comparative Example 3 | 290 | 99.2 | 99.1 | 14.16 |
| Comparative Example 4 | 300 | 99.4 | 99.0 | 14.17 |
| Comparative Example 5 | 315 | 99.0 | 98.6 | 14.18 |

(1) As is clear from Table 1 and FIG. 9, the batteries of Examples 1 to 6 are enhanced in roundness by the activation, whereas the batteries of Comparative Examples 1 and 3 to 5 are deteriorated in roundness by the activation.

Also, immediately after the assembling, the batteries of Examples 1 to 6 are lower in roundness than the batteries of Comparative Examples 1 to 5, but after the activation, the batteries of Examples 1 to 6 are higher in roundness than the batteries of Comparative Examples 1 to 5.

This proves that although the batteries of Examples 1 to 6 had relatively low roundness immediately after the assembling, the cross-sectional forms of their electrode assemblies were made nearly round by the activation and consequent expansion of the electrode assemblies.

Among Examples 1 to 6, Examples 2, 3 and 4 of which the circumferential positions of the roll terminating ends of the positive electrode plates were at 200°, 220° and 240°, respectively, had especially high roundness.

(2) As is clear from Table 1 and FIGS. 9 and 10, it can be said that after the activation, the higher the roundness, the smaller the maximum diameter Dmax is.

(3) Before and after the activation, the batteries of Examples 1 to 6 showed a tendency to be decreased in the maximum diameter and increased in the minimum diameter, and thus to be enhanced in roundness. On the other hand, the batteries of Comparative Examples 1 to 5 showed a tendency to be increased in both the maximum and minimum diameters and thus to be lowered in roundness.

This is presumably because, in each of the batteries obtained according to the examples, the hollow at the center of the electrode assembly significantly collapsed when the electrode assembly expanded during the activation, allowing the electrode assembly to shrink in the radial direction along which the battery had the maximum diameter just after the assembling.

The present invention is not limited to the embodiment and examples described above and may be modified in various ways. For example, a compression coil spring may be used as the elastic member of the safety valve.

The positive electrode plate 24 is preferably reduced in thickness at both the roll starting and terminating end portions 36 and 40, as stated above. However, only one of the end portions 36 and 40 may be reduced in thickness or the positive electrode plate may have a constant thickness over its entire length including the end portions 36 and 40.

Figure 11:
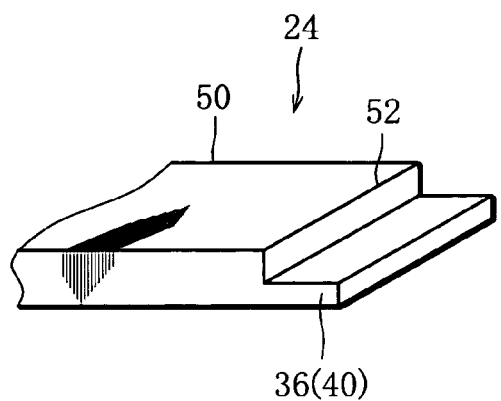
FIG. 11 is a perspective view showing an unrolled state of part of a positive electrode plate according to a modification.

Also, the shape of the small-thickness end portions 36 and 40 is not particularly limited. For example, a step may be formed in the radially outward surface of the positive electrode plate 24, as shown in FIG. 11, such that the small-thickness portion has a fixed thickness. The tapered or stepped small-thickness end portions are easy to form and thus are suited for enhancing the productivity of the battery.

Figure 12:
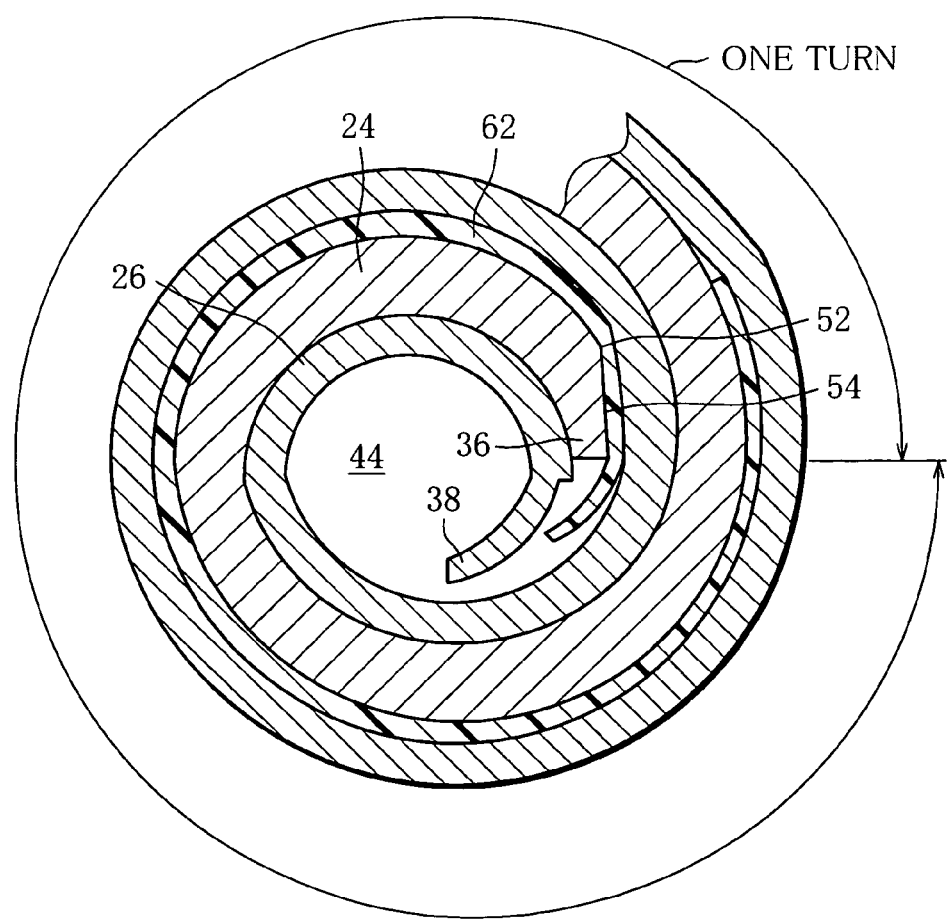
FIG. 12 is a sectional view schematically showing an innermost turn protective member used in place of the boundary protective member for the roll starting end, together with the end portions of the positive and negative electrode plates.

Further, an innermost turn protective member 62 shown in FIG. 12 may be used in place of or in addition to the boundary protective member 56 for the roll starting end portion 36. The innermost turn protective member 62 is also made of a sheetlike, electrically insulating material and covers the entire radially outward surface of the innermost turn (innermost peripheral portion) of the positive electrode plate 24, inclusive of the roll starting end 36. By using the innermost turn protective member 62, it is possible to easily and reliably prevent internal short circuit from occurring and thereby to further enhance the productivity and quality of the battery, for the reason stated below.

In the battery of the present invention, the number N of turns of the positive electrode plate 24 is increased. Thus, the hollow 44 at the center of the electrode assembly 22 is small in size, and since the hollow 44 significantly collapses during the activation, the innermost peripheral portion of the positive electrode plate 24 is liable to be broken or cracked, which is a cause of internal short circuit.

By using the innermost turn protective member 62, it is possible to prevent a broken or cracked portion, if caused, from piercing through the separator 28 and coming into direct contact with the negative electrode plate 26. As a result, internal short circuit can be easily and reliably prevented from occurring, making it possible to further enhance the productivity and quality of the battery.

As the material of the innermost turn protective member 62, a polyolefin polymer having both alkali resistance and hydrophilic property, for example, PP (polypropylene), is preferably used, like the boundary protective member 56. Also, the innermost turn protective member 62 is preferably in the form of a sheet such as a sheet of nonwoven fabric or a tape of resin. A sheetlike material made of resin is flexible and thus can be rolled up with ease, and moreover, because the volume is small, such material is suited for increasing the battery capacity.

In FIG. 12, the separator 28 is omitted in order to avoid crowdedness of lines.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cylindrical type alkaline storage battery comprising:
an electrode assembly contained in a cylindrical container having electrical conductivity, the electrode assembly being a roll obtained by rolling up a positive electrode plate, a negative electrode plate and a separator together,
wherein, provided that a maximum diameter of the container in millimeters is Dmax and that a number of turns of the positive electrode plate is N, a relationship $N \geq [0.5 \times Dmax - 2.65]$ is fulfilled (where "[ ]" represents Gauss' notation),
the electrode assembly is rolled up using a core and has a hollow corresponding to the core at a center thereof,
a value obtained by dividing a cross-sectional area of the electrode assembly except for the hollow, as viewed in cross section of the battery, by a value obtained by subtracting a cross-sectional area of the hollow in the electrode assembly from a cross-sectional area of an interior of the container is greater than or equal to 95% and is smaller than or equal to 100%, and provided that a circumferential position of a roll starting end of the positive electrode plate is a reference position, an angle θ measured from a circumferential position of a roll terminating end of the positive electrode plate to the reference position along the positive electrode plate is in a range of from 180° to 270°, both inclusive,
the positive electrode plate has
an electrode body extending between the roll starting end and the roll terminating end; and
a small-thickness portion that is located in the roll terminating end and is smaller in thickness than the electrode body, wherein
the battery further has an insulating boundary protective member that is interposed between the separator covering a radially outward surface of the positive electrode plate and the positive electrode plate; the boundary protective member covers a boundary between the small-thickness portion and the electrode body; and the boundary exists only in the radially outward surface of the positive electrode plate; and the surface opposite to the boundary in the positive electrode plate is flat,
wherein roundness of the cross-sectional form of the electrode assembly after activation process is higher than that of the cross-sectional form of the electrode assembly before the activation process, and the cross-sectional area of the hollow after the activation process is smaller than that of the hollow before the activation process.

2. The battery according to claim 1, further comprising an innermost turn protective member having electrical insulating property and covering a radially outward surface of an innermost turn of the positive electrode plate, inclusive of the roll starting end.

3. The battery according to claim 2, wherein the innermost turn protective member comprises one of a tape made of resin and a nonwoven fabric made of resin.

4. The battery according to claim 1, wherein the boundary protective member comprises one of a tape made of resin or a nonwoven fabric.

5. The battery according to claim 1, wherein the small-thickness portion has one of a fixed thickness or a gradually varying thickness.

6. The battery according to claim 1, wherein the core has an outside diameter smaller than or equal to 30% of the maximum diameter of the container.

7. The battery according to claim 1, wherein the angle θ is in a range of from 200° to 240°, both inclusive.

8. The battery according to claim 1, wherein the battery is of AA size and the number N of turns of the positive electrode plate is four or more.

9. The battery according to claim 1, wherein the battery is of AAA size and the number N of turns of the positive electrode plate is two or more.

10. The battery according to claim 4, wherein the small-thickness portion has one of a fixed thickness and a gradually varying thickness.

11. The battery according to claim 10, wherein the core has an outside diameter smaller than or equal to 30% of the maximum diameter of the container.

12. The battery according to claim 11, wherein the angle θ is in a range of from 200° to 240°, both inclusive.

13. The battery according to claim 12, wherein the resin out of which the boundary protective member is made is polyolefin.

14. The battery according to claim 13, wherein the resin out of which the boundary protective member is made is polypropylene.

15. The battery according to claim 14, wherein the battery is of AA size and the number N of turns of the positive electrode plate is four or more.

16. The battery according to claim 14, wherein the battery is of AAA size and the number N of turns of the positive electrode plate is two or more.

17. A cylindrical type alkaline storage battery comprising:
an electrode assembly contained in a cylindrical container having electrical conductivity, the electrode assembly being a roll obtained by rolling up a positive electrode plate, a negative electrode plate and a separator together,
wherein, provided that a maximum diameter of the container is Dmax (mm) and that the number of turns of the positive electrode plate is N, a relationship $N = [0.5 \times Dmax - 2.65]$ is fulfilled (where "[ ]" represents Gauss' notation),
the electrode assembly is rolled up using a core and has a hollow corresponding to the core at a center thereof, a value obtained by dividing a cross-sectional area of the electrode assembly except for the hollow, as viewed in cross section of the battery, by a value obtained by subtracting a cross-sectional area of the hollow in the electrode assembly from a cross-sectional area of an interior of the container is greater than or equal to 95% and is smaller than or equal to 100%, and provided that a circumferential position of a roll starting end of the positive electrode plate is a reference position, an angle θ measured from a circumferential position of a roll terminating end of the positive electrode plate to the reference position along the positive electrode plate is in a range of from 180° to 265°, both inclusive, wherein roundness of the cross-sectional form of the electrode assembly after activation process is higher than that of the cross-sectional form of the electrode assembly before the activation process, and the cross-sectional area of the hollow after the activation process is smaller than that of the hollow before the activation process.

\* \* \* \* \*